United States Patent [19]

Kelley

[11] 4,073,680
[45] Feb. 14, 1978

[54] TOROIDAL BAND LIMITER FOR A PLASMA CONTAINMENT DEVICE

[75] Inventor: George G. Kelley, Kingston, Tenn.

[73] Assignee: The United States of America as represented by the United States Department of Energy, Washington, D.C.

[21] Appl. No.: 590,746

[22] Filed: June 26, 1975

[51] Int. Cl.² .............................................. G21B 1/00
[52] U.S. Cl. ..................................... 176/3; 315/111.7
[58] Field of Search .......................... 315/111.1–111.7; 313/231.3; 176/1, 3

[56] References Cited

U.S. PATENT DOCUMENTS

| 3,105,031 | 9/1963 | Thonemann et al. | 176/1 |
|---|---|---|---|
| 3,105,806 | 10/1963 | Thonemann et al. | 176/1 |
| 3,156,621 | 11/1964 | Josephson | 176/1 |
| 3,728,217 | 4/1974 | Dandl | 176/1 |
| 3,886,402 | 5/1975 | Furth et al. | 176/1 |

OTHER PUBLICATIONS

Physics Today (11/75) p. 38, Kadomtsev et al.
Science, vol. 166 (10/17/69) pp. 363–364, Holcomb.
Acronyms and Initialisms Dictionary, 4th Ed., Gale Research Co. (9/14/73), p. 572, Crowley et al.
Technology Review (11/76) pp. 20–43, Feirtag et al.
Conf-740402-Pt, pp. 619–633, 4/74.

*Primary Examiner*—Samuel W. Engle
*Assistant Examiner*—S. A. Cangialosi
*Attorney, Agent, or Firm*—Dean E. Carlson; Stephen D. Hamel

[57] ABSTRACT

This invention relates to a toroidal plasma confinement device having poloidal and toroidal magnetic fields for confining a toroidal plasma column with a plasma current induced therein along an endless, circular equilibrium axis in a torus vacuum cavity wherein the improvement comprises the use of a toroidal plasma band limiter mounted within the vacuum cavity in such a manner as to ensure that the plasma energy is distributed more uniformly over the limiter surface thereby avoiding intense local heating of the limiter while at the same time substantially preventing damage to the plasma containment wall of the cavity by the energetic particles diffusing out from the confined plasma. A plurality of poloidal plasma ring limiters are also utilized for containment wall protection during any disruptive instability that might occur during operation of the device.

3 Claims, 1 Drawing Figure

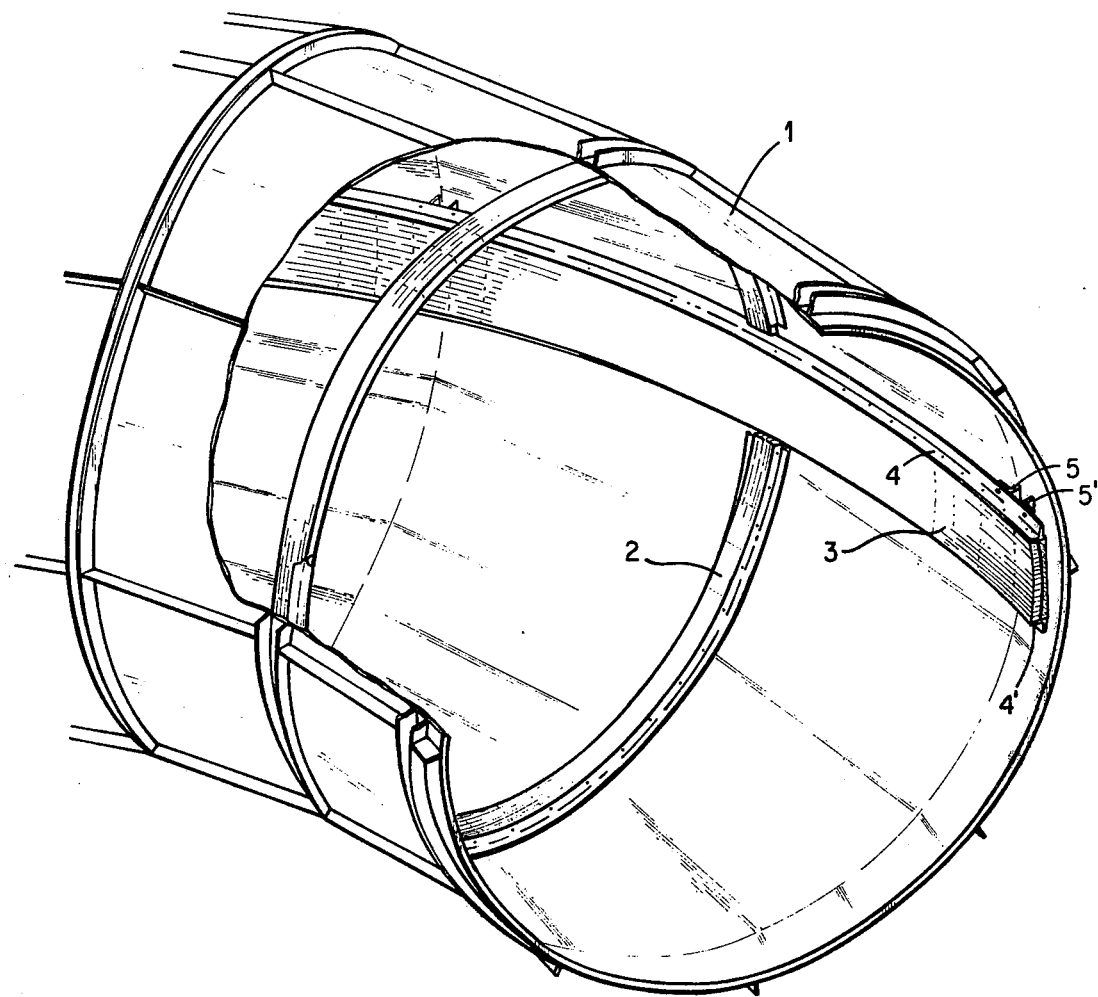

TOROIDAL BAND LIMITER FOR A PLASMA CONTAINMENT DEVICE

BACKGROUND OF THE INVENTION

This invention was made in the course of, or under, a contract with the Energy Research and Development Administration.

Large plasma containment devices such as tokamaks are of considerable research interest at the present time in the quest for practical fusion power. One such device is the ORMAK described in the ORNL Thermonuclear Division Report, ORNL-4688, dated August, 1971, and another such device is the ORMAK F/BX described in the ORNL Thermonuclear Division Report, ORNL-TM-4634, issued on July 11, 1974. In such devices, a fraction of the normal plasma energy is expected to leave the plasma in the form of radiation and energetic charge exchange neutral particles and, in some cases, neutrons. This energy is deposited more or less uniformly over the containment wall.

Energy also leaves the plasma in the form of charged particles, ions and electrons. These arrive at the surface of the plasma by plasma convection and conduction processes. Due to the properties of the magnetic field which serves to limit the loss of charged particles, the natural shape of the plasma is a toroid. The minor diameter of this toroid is determined by the "scraping off" of outward-diffusing plasma on the first material surface encountered.

In any typical installation, such as in ORMAK and other existing tokamaks, a poloidal ring limiter is positioned at one azimuthal location around the major axis of the plasma. The basic purpose of this or any limiter is to intercept energetic particles before they can impinge on the containment walls, thus preventing any localized damage which would occur if the most inward point of the containment wall were allowed to limit the plasma size. Variations of the basic poloidal ring limiter have also been recently employed. These are all derived from the understanding that the limiter need not be continuous but could consist of tabs, blades, or rails at one or more locations around the plasma.

In the normal operation of a large toroidal plasma confinement device, the power flux to a conventional poloidal ring limiter may turn out to be severe such that the limiter would function somewhat inadequately due to the intense local heating thereof.

Thus, there exists a need for a more efficient plasma limiter means and/or arrangement of such a means to ensure that the plasma energy is distributed as uniformly as possible over the surface of such a means. The present invention was conceived to meet this need in a manner to be described hereinbelow.

SUMMARY OF THE INVENTION

It is the object of the present invention to provide a band limiter for a toroidal plasma confinement device arranged in such a manner to ensure that the plasma energy is disributed more uniformly over the limiter surface.

The above object has been accomplished in the present invention by providing a vertical toroidal band located on the midplane and at the outer radius of the plasma and extending around the perimeter of the plasma. In any given installation, the band would be shaped for the plasma flux surfaces it will intercept. By this is meant that the band would be shaped so that its mid-region is tangent to the outermost plasma surface and would then flare slightly away from the plasma at the top and the bottom to intercept a shell of plasma surfaces and thus receive a generally uniform particle flux from the scrape-off region of the plasma. In addition, a plurality of evenly placed poloidal limiters are provided for protection of the torus containment wall against rapid transport that might occur during disruptive instabilities.

BRIEF DESCRIPTION OF THE DRAWING

The single FIGURE is a cutaway, sectional view of a portion of the plasma containment torus of toroidal plasma confinement device, illustrating the relative positions of the toroidal band limiter and one of the poloidal ring limiters of the present invention.

DESCRIPTION OF THE PREFERRED EMBODIMENT

The single FIGURE illustrates only a portion of the plasma torus vacuum cavity of a toroidal plasma confinement device having poloidal and toroidal magnetic fields for confining a toroidal plasma column with a plasma current induced therein along an endless, circular equilibrium axis in the vacuum cavity and also illustrating the toroidal band limiter of the present invention along with one of a plurality of poloidal ring limiters utilized within the vacuum cavity. The details of one overall plasma confinement device in which the present invention can be utilized are described in the above-mentioned report ORNL-4688, to which reference is made. It should be understood that the present invention is applicable to any typical tokamak device employing the use of poloidal and toroidal magnetic fields. Since the present invention is only involved with improved means for preventing internal damage to the torus vacuum cavity walls during operation of such a device, the following description will be limited to such improved means.

In the single FIGURE, a plurality of curved sections 1 are joined together by any suitable means such as welding, for example, to form a torus vacuum cavity of a toroidal plasma containment device. The walls of the sections 1 may be of honeycomb construction, for example. A vertical toroidal band limiter 3 is mounted between a pair of angle brackets 4, 4', which are in turn coupled by means of a plurality of pairs of angle brackets 5, 5' to the inside walls of the vacuum cavity sections 1. The band 3 is located on the midplane and at the outer radius of the plasma that is formed during operation of the device, and the band 3 extends around the perimeter of the plasma. In any given installation, the band would be shaped for the plasma flux surface it will intercept. By this is meant that the band would be shaped so that its mid-region is tangent to the outermost plasma surface and would then flare slightly away from the plasma at the top and the bottom to intercept a shell of plasma surfaces and thus receive a generally uniform particle flux from the scrap-off region of the plasma. It can be seen in the drawing that the band 3 has such a flared-out construction.

The toroidal band limiter 3 is constructed from rows of tungsten or molybdenum links, for example, mounted so as to permit thermal expansion while at the same time such link material would be resistant to damage by the high energy charged particles leaving the plasma. The heat collected by the band 3 would be dissipated by radiation to the vacuum shell sections 1 behind the limiter. The band is 25 cm wide, for example, and its midplane surface is located at the smallest minor radius of 60 cm, flaring to 61 cm at the top and bottom edges of the band, while the inside surface of the vacuum cavity is at 65 cm for example. It should be understood that several interruptions in the band limiter can be provided if needed or necessary for injection and diagnostics.

In addition to the toroidal band limiter 3, a plurality of poloidal ring limiters 2, constructed from rows of tungsten links, for example, are positioned, one each, every 30° in the major azimuth around the inside of the vacuum cavity, only one of these rings 2 being shown in the drawing. These poloidal ring limiters are utilized for additional protection during disruptive instabilities that might occur during operation of the device. Rapid enhanced transport that might occur during a disruptive instability could carry charged particles past the band limiter 3 and to the vacuum cavity wall, such that the use of the poloidal ring limiters 2 will protect the cavity wall against this eventuality. The inner edges of the poloidal ring limiters 2 are also at a radius of 61 cm, for example.

The use of the above-described toroidal band limiter 3 provides for the uniform distribution of the surface flux of charged particles over as large an area as possible on the band limiter with the result that intense local heating of the limiter is avoided, and the mechanical and thermal requirements of the limiter material are relaxed, and the use of the toroidal band limiter 3 along with the plurality of poloidal ring limiters 2 will provide for the prevention of damage to the containment walls of the vacuum cavity by the energetic particles leaving the plasma, both during normal operation and during any disruptive instabilities.

This invention has been described by way of illustration rather than by limitation and it should be apparent that it is equally applicable in fields other than those described.

What is claimed is:

1. In a toroidal plasma confinement device having poloidal and toroidal magnetic fields for confining a toroidal plasma column with a plasma current induced therein along an endless, circular equilibrium axis in a torus vacuum cavity, the improvement comprising a toroidal plasma band limiter mounted on the midplane inside of and to the wall of said cavity and at the outer radius of said plasma, said band limiter extending around the perimeter of said plasma, said band limiter being tangent at its mid-region to the outermost plasma surface and flaring away from said plasma at the top and the bottom of the band to intercept a shell of plasma surfaces in the plasma scrape-off region, thus receiving a generally uniform energetic particle flux therefrom, thereby avoiding intense local heating of said band limiter while at the same time preventing vacuum cavity wall damage.

2. The device set forth in claim 1, wherein said band limiter is constructed from a plurality of rows of tungsten links mounted between a pair of angle irons.

3. The device set forth in claim 1, wherein a plurality of poloidal ring limiters are mounted within said cavity to the inside walls thereof at spaced intervals with the inner edges thereof at the same radial distance as the top and bottom edges of said toroidal band limiter, said poloidal ring limiters providing additional protection to the walls of said cavity during disruptive instabilities.

* * * * *